UNITED STATES PATENT OFFICE.

JOB JOHNSON, OF GLENDALE, NEW YORK.

COMPOSITION OF MATTER FOR PAVEMENTS, ROADWAYS, &c.

SPECIFICATION forming part of Letters Patent No. 599,506, dated February 22, 1898.

Application filed May 21, 1897. Serial No. 637,695. (No specimens.)

*To all whom it may concern:*

Be it known that I, JOB JOHNSON, a citizen of the United States, residing at Glendale, in the county of Queens and State of New York, have invented a new and useful Composition for Pavements, Roadways, and the Like, of which the following is a specification.

This invention relates to roadways, pavements, and like surfaces designed to resist wear, shed water, and keep down dampness, and has for its object to combine certain materials and substances in a manner presently to be fully disclosed, whereby the pavement, roadway, or surface is possessed of great durability, is impervious to moisture, capable of resisting the wear and abrasive action incident to climatic changes and traffic, maintains a smooth surface, which is essential to easy riding, and avoids dust and the expense of repairs.

In practicing the invention the bed for the pavement is prepared in the usual way by being graded, shaped, and tamped to render it firm and solid. This bed is covered by a concrete composed of the following ingredients in about the proportions stated—*i. e.*, sharp sand, seventy parts; cement, ten parts; pulverized rock-salt, five parts; wood-sawdust, twelve parts; graphite mineral earth, three parts, and water in sufficient amount to cause the ingredients to combine by being reduced to a plastic condition.

The ingredients are tempered and worked to a homogeneous mass, which is spread upon the prepared bed and allowed to harden. The proportions of the constituent elements vary according to the season of the year, the location, and the climatic conditions and will be determined by experiment.

The graphite mineral earth forming an element of the composition is the earth containing graphite in its natural state and before it is treated for separating the mineral therefrom, and lends elasticity to the composition and does not deteriorate with age. The proportions of the ingredients contained in the composition are preferably determined by bulk, although any manner for attaining the same end may be adopted.

The composition results in the provision of a roadway or pavement which is durable and possessed of a certain degree of elasticity, the latter quality being obtained by the incorporation into the mixture of the sawdust and graphite mineral earth. The composition is peculiarly adapted to be used as a sublayer in a pavement on which a surface layer of tiles, blocks, slabs, or other material is placed, although it may be used in any situation where it is possible to employ a compound of like character.

Having thus described the invention, what is claimed as new is—

A composition for pavements, roadways, &c., consisting of sharp sand, cement, pulverized rock-salt, wood-sawdust, graphite mineral earth, and water, in about the proportions set forth.

In testimony that I claim the foregoing as my own I have hereto affixed my signature in the presence of two witnesses.

JOB JOHNSON.

Witnesses:
CLARKSON H. RHODES,
J. H. SUTPHIN.